United States Patent [19]

Ching

[11] 4,260,719

[45] Apr. 7, 1981

[54] UV STABILIZED POLYCARBONATE RESINS

[75] Inventor: Ta-Yen Ching, Schenectady, N.Y.

[73] Assignee: General Electric Company, Schenectady, N.Y.

[21] Appl. No.: 131,156

[22] Filed: Mar. 17, 1980

[51] Int. Cl.³ .................... C08G 63/62; C08G 63/64
[52] U.S. Cl. .................................. 528/196; 528/191; 528/192; 528/199; 528/203; 528/204
[58] Field of Search ............ 528/196, 199, 203, 204, 528/191, 192

[56] References Cited

U.S. PATENT DOCUMENTS 3,157,617  11/1964  Butterworth et al. ............... 528/203

Primary Examiner—Lester L. Lee
Attorney, Agent, or Firm—Joseph T. Cohen; James C. Davis, Jr.

[57] ABSTRACT

Polycarbonate resins can be rendered resistant to ultraviolet light by chain-stopping the resins with certain cyanoacrylate moieties.

5 Claims, No Drawings

UV STABILIZED POLYCARBONATE RESINS

This invention is concerned with polycarbonate resins having good stability to UV light. More particularly, the invention relates to cyanoacrylate terminated polycarbonate resins having the general formula

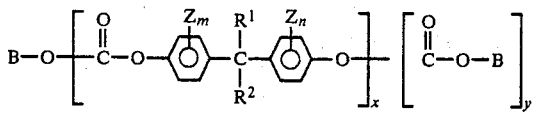   I.

wherein B is a moiety having the general formula

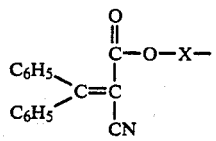

derived, for instance, from an orthoformate of the general formula

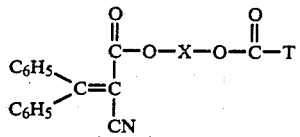   II.

where Z is independently selected from the class consisting of hydrogen, alkyl radicals from 1–3 carbon atoms (e.g., methyl, ethyl, propyl, etc.), and halogen (e.g., chlorine, bromine, etc.), $R^1$ and $R^2$ are independently selected from the class consisting of hydrogen, alkyl radicals of from 1–2 carbon atoms and the phenyl radical, m and n are integers equal to from 1–2, inclusive, x is an integer greater than 1, for example, from 5–10,000 or more, T is halogen (e.g., chlorine, bromine, etc.) or phenoxy and X is a divalent saturated alkylene or alkylidene radical of the $C_1$–$C_{10}$ series, for example,
—$CH_2CH_2$—, —$CH_2$—$(CH_2)_2$—$CH_2$—, —$CH_2$—$(CH_2)_4$—$CH_2$—, —$CH_2$—$C(CH_3)_2$—$CH_2$—, —$CH_2$—$(CH_2)_8$—$CH_2$—, etc.

Polycarbonate resins have found extensive acceptance in the film and molding arts because of their exceptional strength and impact resistance. One of the problems associated with polycarbonate resins is their reduced resistance to light and particularly UV light where exposure to such elements causes yellowing and darkening of the polycarbonate resin. Various methods have been attempted in the past to incorporate a UV stabilizer in polycarbonate resins to minimize this disadvantage. Although for some applications, this stabilization is satisfactory by mechanically incorporating UV stabilizers in the polycarbonate resins, it has been found that there is a maximum amount of UV stabilizer which can be incorporated in the polycarbonate resin before adversely affecting the physical properties of the resin. This has been a limiting factor in the amount of UV stabilization which can be introduced in polycarbonate resins.

Moreover because the molecular structures of the usual UV stabilizers are often so different from the molecular structures of the polycarbonate resins, there have existed incompatibility tendencies between the UV stabilizers and the polycarbonate resins. Moreover, in order to incorporate the UV stabilizers in the polycarbonate resins, it has been necessary to blend the stabilizer with the resin on blending or mixing machines which adds to the cost of making a stabilized polycarbonate resin and often leads to loss of stabilizer due to volatilization. Unexpectedly, I have discovered that polycarbonate resins having exceptionally good stability in the presence of UV light can be prepared by incorporating the UV stabilizer into the polycarbonate molecule without requiring any mechanical blending of the stabilizer and the polycarbonate resin, and insuring that none of the stabilizer is volatilized, either during processing or during use of the resin as is apt to occur when the UV stabilizer is mechanically blended into the polycarbonate resin. More particularly, I have discovered that one can interact an orthochloroformate coming under general formula II corresponding to

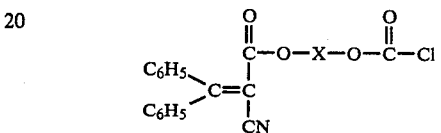   IIa.

and a dihydric phenol of the general formula

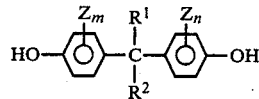   III.

in the usual manner and under conditions whereby polycarbonate resins are made to form UV stabilized polycarbonates of formula I where the UV stabilizing portion B-O of the molecule acts both as a stabilizer and as a chain-stopping agent for molecular weight control of the polymer (as is normally accomplished by the use of phenol or similar monofunctional materials in end-capping polycarbonates for the above purpose) where X has the meaning above. Mixtures of the orthoformates and phenol are not precluded.

Among the dihydric phenols of formula III which may be used to make aromatic polycarbonates and which may be employed in the practice of the present invention, may be mentioned, 2,2-bis(4-hydroxyphenyl) propane (also identified as "Bisphenol-A") as well as other dihydric aromatic compounds, for instance,
bis-(4-hydroxyphenyl),
2,4'-dihydroxydiphenyl,
2,4'-dihydroxydiphenyl methane,
bis-(2-hydroxyphenyl) methane,
bis-(4-hydroxyphenyl) methane
bis-(4-hydroxy-5-nitrophenyl) methane
bis-(4-hydroxy-2,6-dimethyl-3-methoxyphenyl) methane
1,1-bis-(4-hydroxyphenyl) ethane,
1,2-bis-(4-hydroxyphenyl) ethane,
1,1-bis-4-hydroxy-2-chlorophenyl) ethane,
1,1-bis(2,5 dimethyl-4-hydroxyphenyl) ethane,
1,3-bis-(3-methyl-4-hydroxyphenyl) propane,
2,2-bis-(phenyl-4hydroxyphenyl) propane,
2,2-bis-(3-isopropyl-4-hydroxyphenyl) propane,
2,2-bis-(4-hydroxynaphthyl) propane,
2,2-bis-(4-hydroxyphenyl) butane,
1,4-bis-(4-hydroxyphenyl) butane,
2,2-bis-(4-hydroxyphenyl) pentane, 3,3-bis-(4-hydroxyphenyl) pentane,
2,2-bis-(4-hydroxyphenyl) heptane,
bis-(4-hydroxyphenyl)-phenyl methane,
bis-(4-hydroxyphenyl)-cyclohexyl methane,
1,2-bis-(4-hydroxyphenyl)-1,2-bis(phenyl) ethane,
2,2-bis-(4-hydroxyphenyl)1,3-bis(phenyl) propane,
2,2-bis(4-hydroxyphenyl)-1-phenyl propane, and the like Mixtures of the foregoing dihydroxyaryl compounds can also be used to produce carbonate resins containing a plurality of dihydroxydiaryl moieties.

An example of a dihydroxydiaryl compound prepared from a halogenated phenol is 2,2-bis-(3-chloro-4-hydroxyphenyl) propane, prepared by reacting o-chlorophenol with acetone. Halogenation of the dihydroxydiaryl compounds described above may be readily controlled so as to introduce the desired number of halogen atoms in each aryl nucleus by the method of Zinch et al., Ann. 343, 75–131 (1905), or Moss, British Pat. No. 491,792. Dihydroxydiaryl compounds can be prepared in the manner described in U.S. Pat. Nos. 2,182,308—Britton et al., 2,191,831—Perkins, and 2,468,982—Jansen.

The orthochloroformates under formula IIa which can be used for making the polycarbonate compositions of this invention are more particularly disclosed and claimed in my copending application, Ser. No. 131,157 allowed filed concurrently herewith and assigned to the same assignee as the present invention. By reference, the disclosures and teachings in that application are made part of the disclosure and teachings of the instant application.

In general, the polycarbonate resins of the instant invention can be prepared by interaction between the orthochloroformates of formula IIa and the dihydric phenol in the presence of a carbonation precursor at temperatures of from 30° to 100° C. or higher, for times varying from 0.5 to 5 hours or more to form the polycarbonate linkages. Phosgenation linkages can now be formed either by treatment of the dihydric compound and the orthochloroformate with a carbonate precursor such as phosgene, or an ester, for instance, diphenyl carbonate, etc., by means of an ester exchange reaction. When phosgene is used, the reaction is carried out in a solvent such as methylene chloride, in the presence of an amine, such as triethylamine, pyridine, etc.

When using, for instance, diphenylcarbonate, the reaction is advantageously carried out at subatmospheric pressure, for instance at reduced pressure of from around 0.01 to 5–10 mm. of mercury, preferably while blanketing the reaction mixture with a non-oxidizing or inert atmosphere, such as nitrogen, helium, etc., to prevent undesirable oxidative effects. The use of atmospheric and superatmospheric pressure is, however, not precluded.

The product is recovered, for example, by washing the reaction mixture with water, dilute acid and more water, then purging the mixture into a large excess of a non-solvent for the polymer, e.g., methanol. The precipitated material can be recovered and dried by conventional methods. Another procedure is to carry out the reaction in a two phase aqueous organic solvent system, e.g., water-methylene chloride, in the presence of a base, such as an alkali metal hydroxide. More particular directions for making these polycarbonates can be found disclosed in U.S. Pat. No. 3,915,926 issued Oct. 28, 1975 and assigned to the same assignee as the present invention. By reference, this patent is made part of the disclosures and teachings of the instant application.

In the above reaction, the orthochloroformate of formula IIa acts not only as a UV stabilizing agent, but also as a monofunctional compound is capable of reacting with the dihydric phenols advantageously in the presence of phosgene, to form the end groups of the polycarbonate resin in the same manner that monofunctional groups such as phenol, tertiary butyl phenol, cyclohexyl phenol, etc. accomplish for the purpose of regulating the molecular weight of the polycarbonates within wide limits. Other directions for making the polycarbonates of the instant invention using the procedures therein described for making my compositions can be found in U.S. Pat. No. 3,028,365 issued Apr. 3, 1962 U.S. Pat. No. 3,153,008 issued Oct. 13, 1964 and U.S. Pat. No. 2,997,459 issued Aug. 22, 1961. By reference these patents are made part of the disclosures and teachings of the instant application.

In order that those skilled in the art can better understand how the present invention can be practiced, the following examples are given by way of illustration and not by way of limitation. All parts are by weight unless otherwise indicated.

The following example illustrates the preparation of one of a number of chloroformates corresponding to the formula IIa, which orthochloroformates are more particularly disclosed and claimed in my aforementioned copending application Ser. No. 131,157 allowed filed concurrently herewith.

EXAMPLE 1

This example illustrates the preparation of the monochloroformate having the formula

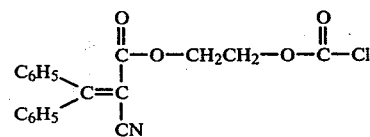

More particularly, 0.35 mol of the cyanoacrylate having the formula

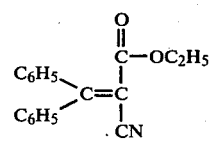

1.0 mol ethylene glycol and a catalytic amount (0.1 gram) sodium methoxide were heated under reflux conditions in 200 ml of dry toluene for 30 minutes. After azeotropic removal of ethanol, the solution was washed with aqueous 5% HCl, than aqueous 5% sodium bicarbonate, and thereafter with water. The organic extract obtained was dried over magnesium sulfate after which the solvent was evaporated after first subjecting the dried organic extract to filtration. This resulted in quantitative yield of the compound having the formula

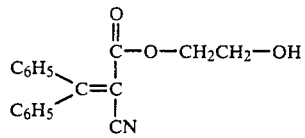

The identity of this compound was established by NMR, and by infrared analysis. The chloroformate of formula VI was prepared by first forming a solution of 1 mol of phosgene and methylene chloride by bubbling the phosgene into the methylene chloride at 0° C. To this solution was added a methylene chloride solution containing 0.3 mol of the compound of formula VI dropwise while stirring. The solution thus obtained was warmed to room temperature gradually for 1 hour while continuing the stirring, and excess phosgene was then removed by purging nitrogen into the solution. Subsequent evaporation of the methylene chloride afforded quantitative formation of the chloroformate of formula IV as established by NMR and infrared analyses.

EXAMPLE 2

Employing the chloroformate of Example 1, a polycarbonate resin chain-stopped with the residue from the monochloroformate of Example 1 was prepared as follows. To 11.1 grams (48.5 m mole)Bisphenol-A, was added 0.53 gram of the chloroformate of formula IV, 32 ml methylene chloride and 0.07 ml triethylamine. While stirring vigorously, 26 ml water was added followed by dropwise addition of a 50 weight percent aqueous solution of sodium hydroxide in order to maintain a pH of 11±0.2. At this point, phosgene was introduced into the stirred mixture at a temperature of 20°–35° C. for 30 minutes at a rate of 0.18 g/min. After 1.1 equivalents phosgene had been introduced, the formed aqueous solution was washed with 2 portions 25 ml of 5% HCl solution and once with 50 ml water. The solution was diluted with 50 ml $CH_2Cl_2$ and the polymer collected by filtration after it was precipitated from 250 ml $CH_3OH$ and dried. This gave the chain-stopped polycarbonate resin corresponding to the formula

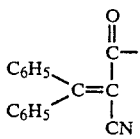

where p is a whole number greater than 1.

EXAMPLE 3

A polycarbonate resin was prepared similarly as in Example 2 with the exception that instead of end-capping the polycarbonate resin with the moiety from the monochloroformate of formula IV, 2.5 mol percent phenol instead was used, based on the molar concentration of the Bisphenol-A.

EXAMPLE 4

In this example the polymers of Examples 2 and 3 as well as a polymer similar to Example 3 but containing mechanically blended therein 0.3%, by weight, of Cyasorb UV 5411, which is a well known UV stabilizer manufactured by American Cyanamid Company were subjected to sunlamp aging tests conducted in accordance with ASTM-D-1925 on a Gardner XL-20 colorimeter.

TABLE I

| Test No. | Chain Stopper | *Intrinsic Viscosity | Tg °C. | ΔYI of RS Sunlamp Aging | | |
|---|---|---|---|---|---|---|
| | | | | 1 Week | 2 Weeks | 3 Weeks |
| 1 | Chloroformate of Formula IV | 0.81–0.86 | 147 | −1.0 | 0.8 | 2.0 |
| 2 | Phenol | 0.62–0.67 | 149 | 4.2 | 8.3 | 9.5 |
| 3 | Phenol + Mechanically blended Cyasorb 5411 | — | 149 | 4.0 | 5.7 | 7.6 |

*In dl/g measured at 25° C. in $CHCl_3$

The above results show clearly the markedly increase in ultraviolet light stability attained by my invention as contrasted to the results obtained by the usual polycarbonate resins.

EXAMPLE 5

When chain-stopped polycarbonate resins similarly as the one described in Example 2 are prepared using in place of the chloroformate of formula IV, other monochloroformates, for example,

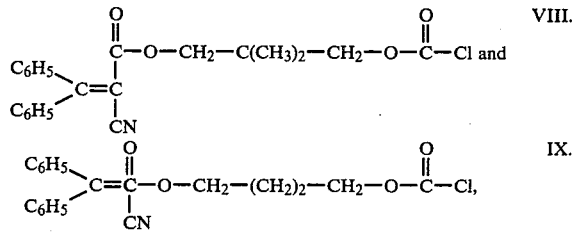

chain-stopped polycarbonate resins similar to that obtained in formula VII are derived, with the exception that, respectively, the chain-stopper moieties on the polycarbonates would be derived from the compounds of formulas VIII and IX. Specifically, the chain-stopping moieties would have the formulas

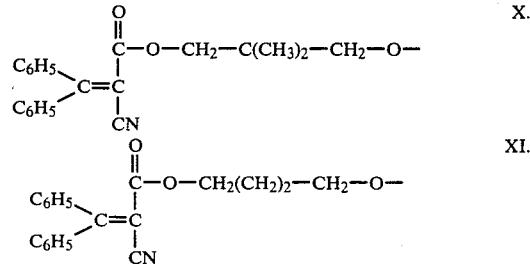

Orthoformates of formula II, where T is the phenoxy radical can be prepared by interacting an orthochloroformate of formula IIa and phenol in the presence of a hydrohalide acceptor, e.g., pyridine, to form the desired phenoxy-substituted compound.

It will of course be apparent to those skilled in the art that other chloroformates many examples of which have been disclosed and claimed in my copending application, Ser. No. 131,157 referred to above may be used in the practice of my invention. Other dihydric aromatic compounds may be employed in place of those recited in the foregoing examples without departing from the scope of the invention. Additionally other conditions of reaction and other modifying agents as well as mixtures of dihydric aromatic compounds in addition to those recited in the foregoing examples, may be employed within the scope of the intended invention.

Many advantages are derived from the UV stabilizer becoming part of the polycarbonate molecule, as are more particularly recited previously. Included among these advantages is the fact that the amount of UV stabilizer incorporated can be controlled quite readily up to a maximum amount (about 2.5 to 5 mol percent, based on the polycarbonate resin, depending on the molar concentration of the chain-stopping UV stabilizer as a molar percent of the total molar content of the polycarbonate molecule. Since the UV stabilizer is incorporated into the molecule, there is no need for blending or mixing of the UV stabilizer with the polycarbonate resin so that a time-consuming and often expensive step is thus eliminated. What is equally important is the fact that by incorporating the UV stabilizer into the molecule of the polycarbonate, in addition to maintaining the properties of the polycarbonate resin, one avoids loss of the UV stabilizer as a result of either the previous mechanically blending the stabilizer into the polycarbonate resin at elevated temperatures, or when the polycarbonate is used in any particular application where the polycarbonate material may be subjected to elevated temperatures, thus causing either sublimation or evaporation of the UV stabilizer thereby reducing the protective effect of the stabilizer.

Polycarbonate resins chain-stopped with the moieties derived from the orthoformates of formula II have many uses where resistance to sunlight is required. Thus, coverings for luminaires, lens for automobile lights and glazing or window materials which are subjected to UV light can be made with the chain-stopped polycarbonates of the instant invention so as to provide an extremely valuable means for resisting any degrading or coloring effects of UV light. Film material used for wrapping made from the polycarbonate resins, which may come under the influence of UV light advantageously employ the chain-stopped orthoformate moieties in the present invention, to maintain the clarity of the film even when the latter is subjected to high concentrations of UV light.

One of the uses to which the UV stabilized compositions of the present invention may be employed is as a coating or laminate affixed to a resinous substrate which in itself is subject to UV degradation. For instance, instead of using the instant UV stabilized polycarbonate resins as the complete molded sheet for whatever application is intended, one can form a solution (e.g., in toluene, methylene chloride, etc.) of the UV stabilized composition and apply it to the surface of a resinous substrate, such as another polycarbonate resin, polyester resin, acrylate resin, etc. which themselves are subject to degradation by UV light. By evaporation of the solvent, one obtains a thin coating on the substrate which will enable the substrate to withstand much of the ill effects encountered when subjected to UV light.

Alternatively, the UV stabilized compositions of the present invention may be co-extruded with other resins, such as polycarbonate resins, polyester resins, etc., which are subject to UV degradation so that a thin laminate is formed on top and securely adhered to the unprotected polymeric substrate. The manner in which such co-extrusion can be carried out is advantageously performed on mechanical equipment readily available in the arts, such as the feed-block method as described in U.S. Pat. No. 3,223,761—Raley and manufactured by Johnson Plastics Machinery Company of Chippewa, Wisconsin (see also "Co-extrusion" by James E. Johnson, Plastics Technology, February, 1976).

The thickness of the extruded surface of the UV stabilized polycarbonate resin can vary widely from about 0.01 to as thick as 5 mils or more. The co-extrusion in the hot molded condition enables a strong bond to form between the UV stabilizer-containing polycarbonate resin and the substrate without any priming of the surfaces comprising the substrate and the upper coating or laminate. By using the above method for either coating or co-extrusion (or laminating), one can afford protection to large areas of resinous substrates, particularly polycarbonate substrates, with a minimum of processing and usually carried out at the same time that the substrate itself is molded for any particular application. Tests have shown that the use of such means for protecting, for instance, polycarbonate resin with a thin layer of the UV stabilizer-containing polycarbonate resin is as good in many instances as though the UV stabilizer had either been interpolymerized in the manner described in the instant application or in my copending application, Ser. No. 123,667, filed Feb. 22, 1980 and assigned to the same assignee as the present invention.

What I claim as new and desire to secure by Letters Patent of the Unites States is:

1. A UV-stable aromatic polycarbonate resin chain-stopped with a grouping having the formula

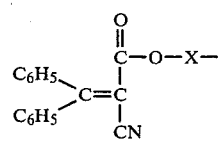

where X is a divalent saturated alkylene or alkylidene radical of the $C_1$–$C_{10}$ series.

2. A UV-stable aromatic polycarbonate resin chain-stopped with a grouping having the formula

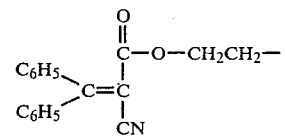

3. A UV-stable aromatic polycarbonate resin chain-stopped with a grouping having the formula

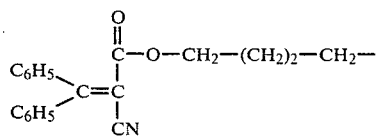

4. A UV-stable aromatic polycarbonate resin chain-stopped with a grouping having the formula
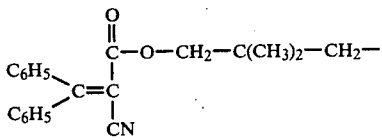
5. A UV-stable polycarbonate resin corresponding to the formula
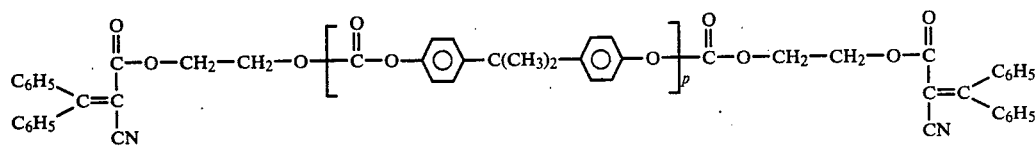
where p is a whole number greater than 1.
* * * * *